Jan. 23, 1968     A. MUSSCHOOT ET AL     3,365,281
METHOD AND APPARATUS FOR AGGLOMERATING ON INCLINED SURFACES
INCLUDING VIBRATING THE MATERIAL AT A GREATER ANGLE
THAN THE INCLINATION OF THE SURFACE
Filed June 9, 1964     2 Sheets-Sheet 1
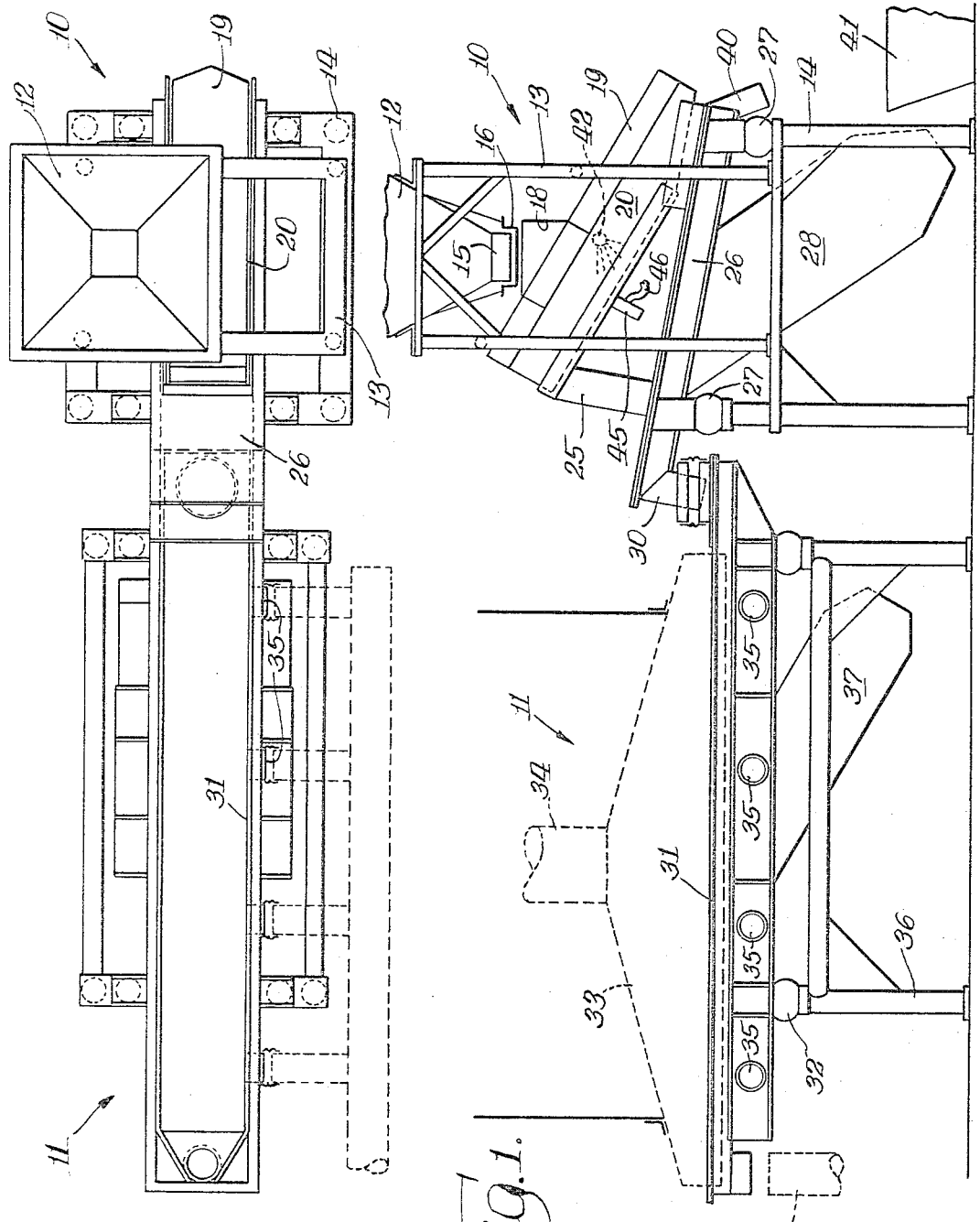
INVENTORS.
Albert Musschoot,
Marvin G. Thomson.
By Hofgren, Wegner, Allen,
Stellman & McCord Attys.

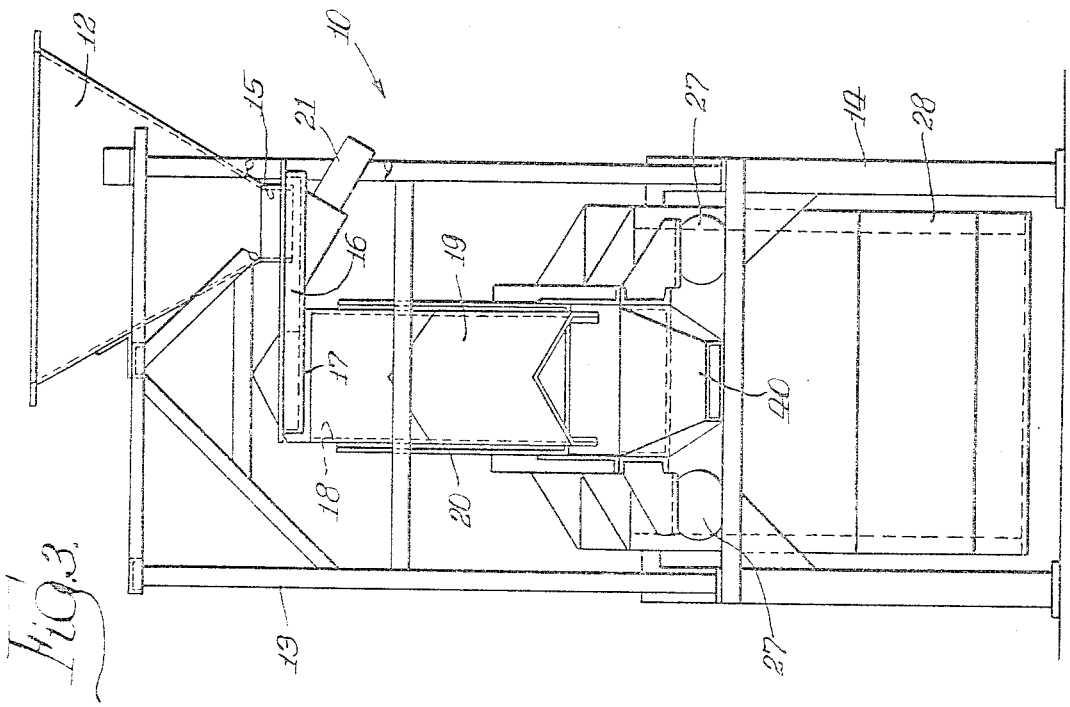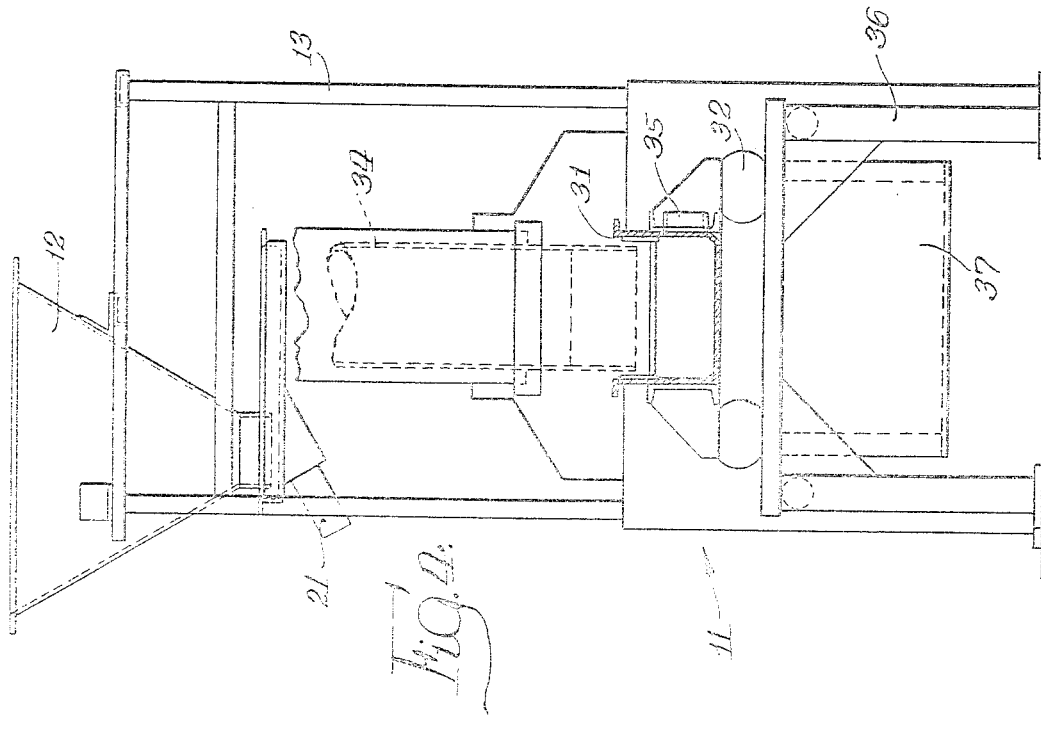

United States Patent Office 3,365,281
Patented Jan. 23, 1968

3,365,281
METHOD AND APPARATUS FOR AGGLOMERATING ON INCLINED SURFACES INCLUDING VIBRATING THE MATERIAL AT A GREATER ANGLE THAN THE INCLINATION OF THE SURFACE
Albert Musschoot, Barrington, and Marvin G. Thomson, Prospect Heights, Ill., assignors to General Kinematics Corporation, a corporation of Illinois
Filed June 9, 1964, Ser. No. 373,807
2 Claims. (Cl. 23—313)

ABSTRACT OF THE DISCLOSURE

This is an agglomerating apparatus comprising one or more upwardly inclined vibrating surfaces with the angle of inclination of the troughs being arranged so that agglomerated particles of larger size move toward the lower end of the troughs, while particles of smaller size are removed toward the upper end of the troughs, thereby effecting a separation by size of the agglomedated particles.

---

This invention relates to methods and apparatus for agglomerating materials.

It is the general object of the present invention to produce new and improved methods and apparatus of the character described.

At the present time, there is a great deal of interest in various systems and methods for agglomerating material. This is particularly true in the fields dealing with powdery materials which, although soluble, are difficult to dissolve because of the powdery character. Accordingly, a number of methods have been suggested for agglomerating or clumping together particles of such material to produce a product in which the particle size is substantially increased with the resulting increase in ready solubility of the material.

According to one method of agglomerating, the material is maintained on a vibrating surface and subjected to the agglomerating process. The agglomerated particles of the material are removed from the area where agglomeration is taking place by various methods. One of the difficulties encountered in utilizing such methods is the fact that the powdery material tends to build up in a layer, with the result that only the upper portion of the material is subjected to the agglomerating process. Waste and general inefficiency result. It is therefore a further object of the present invention to provide a method and apparatus usable in the type of agglomerating process just described which prevents the build up of a layer of powdery material and results in all of the powdery material introduced into the agglomeration zone being included in the agglomerating process.

Agglomerating processes are known wherein the material to be agglomerated is carried on an inclined vibrating surafce, usually in the form of a trough, and subjected to the agglomerating process. Powdery material to be agglomerated is maintained near the upper end of the trough by virtue of the upwardly conveying action of the vibrations, while agglomerated particles move toward the lower end of the trough under the influence of gravity. In such processes, however, all agglomerated particles above a predetermined size move to the lower end of the trough and even those far above the desired size are carried along with the others and form a part of the final product. Where agglomeration is done by wetting the powdery material, as from a spray, some of the larger particles are in the form of "mud balls" and when maintained with agglomerated particles of the desired size, have a deleterious effect on the resultant product. According to the present invention, however, there is provided methods and apparatus whereby agglomerated particles of undesired size may be separated from the others with the result that the final product is clearly improved.

Other advantages and objects of the present invention will be readily apparent from the following description and drawings, in which:

FIG. 1 is a side elevational view of an apparatus embodying the invention;

FIG. 2 is a top plan view of the apparatus shown in FIG. 1;

FIG. 3 is an elevational view of the right-hand end of FIG. 1; and

FIG. 4 is a similar view of the left-hand end of FIG. 1.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated. The scope of the invention will be pointed out in the appended claims.

Referring now to the drawings, there is shown an agglomerator generally designated 10 connected by means hereinafter to be described to a dryer 11 for drying the particles. The agglomerating apparatus 10 includes a hopper 12 in which the material to be agglomerated is stored for introduction into the system. The hopper is mounted upon an upper frame 13 in turn supported by a lower frame 14 and the hopper is provided with a discharge opening 15 which opens into a trough 16 having a discharge 17 overlying an opening 18 in a hood 19 covering an inclined vibrating trough 20. Secured to the hopper trough 16 is a small vibrator 21 (FIG. 3) which because of its angle relative to the trough, imparts conveying vibrations thereto to move the material from the discharge opening 15 of the hopper to the discharge opening 17 of the trough which overlies substantially the entire width of the vibrating trough 20.

The trough 20 is, as previously indicated, inclined to the horizontal and is secured by a pair of legs 25 at its upper end to a lower inclined trough 26. The opposite end of the trough 20 is also secured to the trough 26 which, while inclined to the horizontal is less steeply inclined than the trough 20. The lower trough 26 is mounted on the lower frame 14 through the medium of air springs 27 which serve to isolate the vibrating assembly of the troughs 20 and 26.

Connected to the lower trough 26 is a vibrating apparatus 28 which may be similar to the apparatus disclosed in our Patent No. 3,089,582. In operation the vibrations induced by the apparatus 28 serve to vibrate both troughs 20 and 26 in a manner as to impart conveying movement from right to left (as seen in FIG. 1) of material placed thereon.

The upper end of the trough 26 is connected by means of a spout 30 to the dryer 11. The dryer 11 forms no part of the present invention and hence it will be described but briefly, as obviously many forms of drying apparatus may be utilized in agglomerating processes requiring a drying step. Thus, the dryer 11 includes a vibrating trough 31 which is mounted on isolation air springs 32. A hood 33 covers the trough and is provided with an exhaust flue or stack 34. The drying air is admitted through the air holes 35 and passes upwardly through the material on the trough 31 carrying evaporated vapor into the stack. A frame 36 supports the dryer and material introduced thereto is carried from right to left as seen in FIG. 1 through the action of vibrator 37 similar to the vibrator 28 and the material is discharged through the spout 38.

Referring again to the right-hand portion of FIG. 1, it will be seen that the trough 26 is provided at the end opposite the end carrying the discharge spout 30 with a second discharge spout 40 positioned to discharge material into a container 41.

Positioned within and beneath the hood 19 covering the trough 20 is a spray pipe 42 and means, not shown, are provided for introducing a liquid under pressure into the spray pipe for emission therefrom in the form of a spray directed toward the material introduced into the trough 20. Also connected to the trough is an electric vibrator 45 energized by means of electric leads 46. The vibrator 45 is one capable of inducing high frequency (sonic or preferably supersonic) wave vibrations to the trough 20 and its action may be more or less continuous, periodic, or intermittent.

In operation, material in the hopper 12 flows into the trough 16 and is moved by the vibrator 21 to the discharge opening 17 for discharge into the trough 20. At this point the material is powdery in form and hence the upwardly conveying motion of the trough 20 serves to move the material toward the left-hand (upper) end of the trough. During this motion, it is subjected to the agglomerating action of the spray issuing from the pipe 42 and agglomerated particles roll by gravity to the lower end of the trough 20 which is provided with an opening so that agglomerated material may fall therefrom into the lower trough 26. The sonic or supersonic waves introduced into the trough 20 by the vibrator 45 prevent the unagglomerated powdery material from building up in a layer on the bottom of the trough 20 as would otherwise be the case, and hence all of the material in the trough 20 is kept "working" and subject to the agglomerating action of the spray.

It will be noted that the angle of inclination of the trough 26 is less than the angle of inclination of the trough 20 and agglomerated particles which move by gravity down the relatively steep incline provided by the trough 20 are conveyed by the conveying action of the vibrations up the slope of the trough 26 where they are introduced into the dryer through the spout 30. Undesirably large agglomerated particles, particularly "mud balls" which are often formed where water is utilized as the spray, will not be conveyed upwardly along the trough 26 but rather, because of their size, will move to the right into the discharge spout 40 from which they may fall into the container 41. Thus, the action of the trough 26 is effectively to remove particles of undesirably large size or character from the rest of the pelletized or agglomerated material, with the result that the end product delivered from the spout 30 contains only particles of the desired size.

It will be clear from the description thus far made that a rather accurate selection of final particle size may be made by adjusting the angles of the troughs 20 and 26. By virtue of such adjusting means (not shown), the angle of inclination of the trough 20 may be varied so that particles below a predetermined size are conveyed upwardly into the agglomeration zone until they are of sufficient size to move downwardly in the trough, and similarly, the angle of the trough 26 may be varied so as to regulate the upper limit of particle size which will be conveyed to the discharge spout 30.

We claim:

1. The method of agglomerating a powdery material which comprises, supporting the material in a first zone on a first surface inclined upwardly and downwardly relative to the horizontal, subjecting the material in the first zone to a vibratory force exerted along a path inclined upwardly and downwardly relative to the horizontal and at a greater angle to the horizontal than the inclination of said first surface, said vibratory force being sufficient to move the material in powdery form in an upwardly direction along said first surface, agglomerating the powdery material while the same is subject to said vibratory force, said vibratory force being insufficient to hold the agglomerated material in upward movement whereby the agglomerated material moves downwardly along said first surface, conducting the agglomerated material to a second zone, supporting the material in the second zone on a second surface inclined upwardly and downwardly relative to the horizontal and at a lesser angle to the horizontal than the inclination of the first surface, subjecting the agglomerated material in said second zone to vibratory force exerted along a path inclined upwardly and downwardly relative to the horizontal and at a greater angle to the horizontal than the inclination of the second surface, the last-mentioned vibratory force being sufficient to move agglomerated particles of less than a predetermined size in an upward direction along said second surface to form an upwardly moving stream of agglomerated particles, and said last-mentioned vibratory force being insufficient to hold agglomerated particles larger than said size in such upward movement thereby causing agglomerated particles larger than said size to move in a downward direction along said second surface to form a downwardly moving stream of agglomerated particles, and separating said streams.

2. Agglomerating apparatus comprising, means providing a first trough inclined upwardly and downwardly relative to the horizontal, means providing a second trough inclined upwardly and downwardly relative to the horizontal, means for vibrating said troughs along a path inclined upwardly and downwardly relative to the horizontal and at a greater angle to the horizontal than the inclination of said troughs, means for introducing material to be agglomerated in an even distribution across said first trough to be urged toward the upper end thereof under the influence of said vibrating means, means for agglomerating the material in said first trough, the inclination of said first trough being such as to cause agglomerated material to move to the lower end thereof under the influence of said vibrating means, means for conducting agglomerated material from the lower end of the first trough to the second trough, the inclination of the second trough being less than the inclination of the first trough to cause agglomerated material of less than a predetermined size to move toward the upper end of the second trough and cause agglomerated material larger than said predetermined size to move toward the lower end of said second trough under the influence of said vibrating means.

References Cited

UNITED STATES PATENTS

| 244,564 | 7/1881 | Dodge | 209—442 |
|---|---|---|---|
| 504,665 | 9/1893 | Bradford | 209—442 |
| 791,711 | 6/1905 | Morgan | 209—433 |
| 811,609 | 2/1906 | Winn | 207—442 |
| 1,368,901 | 2/1921 | Cushman | 209—433 |
| 255,160 | 3/1882 | Garvin | 209—442 |
| 504,665 | 9/1893 | Bradford | 209—442 |
| 2,553,714 | 5/1951 | Lucas | 23—313 |
| 3,076,545 | 2/1963 | Bodine | 209—1 |
| 3,171,159 | 3/1965 | Cunder | 23—313 |

FOREIGN PATENTS

| 1,007,355 | 10/1965 | Great Britain. |
|---|---|---|

G. HINES, *Assistant Examiner.*

NORMAN YUDKOFF, *Primary Examiner.*